United States Patent [19]

Mumcu et al.

[11] Patent Number: 5,527,847
[45] Date of Patent: Jun. 18, 1996

[54] PROCESS FOR INCORPORATING A PLASTICIZER INTO A POLYAMIDE

[75] Inventors: Salih Mumcu; Weigand Krämer; Wolfgang Kriesten, all of Marl; Hans J. Panoch, Haltern, all of Germany

[73] Assignee: Huels Aktiengesellschaft, Marl, Germany

[21] Appl. No.: 181,087

[22] Filed: Jan. 13, 1994

[30] Foreign Application Priority Data

Jan. 23, 1993 [DE] Germany .................. 43 01 809.2

[51] Int. Cl.$^6$ .................. C08K 5/13; C08J 3/05
[52] U.S. Cl. .................. 524/290; 524/291; 524/292; 528/491; 528/502 R
[58] Field of Search .................. 524/290, 291, 524/292; 528/491, 502

[56] References Cited

U.S. PATENT DOCUMENTS

| | | | |
|---|---|---|---|
| 3,640,761 | 2/1972 | Hamanaka et al. | 524/352 |
| 3,880,803 | 4/1975 | Keizer | 524/151 |
| 4,840,993 | 6/1989 | Bartz | 525/66 |
| 4,959,403 | 9/1990 | Bartmann et al. | 524/169 |
| 5,026,818 | 6/1991 | Heinz et al. | 528/313 |

FOREIGN PATENT DOCUMENTS

| | | | |
|---|---|---|---|
| 0325740 | 8/1989 | European Pat. Off. | |
| 0359037 | 3/1990 | European Pat. Off. | 524/290 |
| 3613528 | 10/1987 | Germany . | |

OTHER PUBLICATIONS

"Kunststoff–Lexikon", pp. 148–149, 484–485, 654–657, 1992, K. Stoeckhert, et al.

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

Plasticizers are homogeneously incorporated into finely divided solid polyamides by mechanically agitating a mixture of plasticizers and polyamides at temperatures of at least 80° C. while the polyamide remains in the finely divided solid phase.

12 Claims, No Drawings

PROCESS FOR INCORPORATING A PLASTICIZER INTO A POLYAMIDE

BACKGROUND OF THE INVENTION

1. Field of the Invention

This invention relates to a process for incorporating a plasticizer into a polyamide in the solid phase, under mild conditions without melt processing.

2. Discussion of the Background

Polyamides are generally rigid materials. For numerous applications, for example shoe soles, fuel and compressed air brake lines or cable casings, they must be rendered flexible by addition of plasticizers.

Plasticizers are usually incorporated into polymers starting with a physical blend of polyamide granules or pellets and plasticizer mixture. This mixture is typically melted and homogenized in a kneader or extruder. The melt is then forced through a perforated plate or die, and the polymer strands are cooled in water and chopped into pellets. However, this process is expensive since it requires special kneaders or mixers with corresponding metering devices to incorporate the correct percentage of plasticizer. In general it takes at least two pelletizing and two drying steps to produce plasticized polymer from monomer.

It is also known, from DE-A 21 53 249, corresponding to U.S. Pat. No. 3,846,357, to blend plasticizers into the polymerized polyamide melt in the reactor. The disadvantage with this process is the heat-sensitive plasticizers decompose during the typical 5- to 8-hour residence time in the reactor at the required temperature range of 220° to 260° C. Plasticizers subsequently undergo undesirable side reactions which damages the product. Deterioration in color is also observed. In this procedure, furthermore, the plasticizer is often partly emitted in the form of an aerosol during discharge of the melt from the reactor. Health problems may arise in the workplaces from such emissions.

DE-A 36 13 528 describes another form of plasticizer incorporation, in the presence of a polyalkenamer. Liquid auxiliaries and additives are incorporated at a temperature of not more than 70° C. However, the process described therein cannot be applied to polyalkenamer-free polymers.

SUMMARY OF THE INVENTION

Accordingly, one object of this invention is to provide a diverse process for the incorporation of plasticizers in solid phase polyamides without using melt processing, which requires extrusion or kneading, and which permits the homogeneous distribution of plasticizer into the solid polymer using mild thermal conditions and mechanical agitation.

These and other objects have been attained by: homogeneously incorporating a plasticizer into a solid phase polyamide, by applying a plasticizer to a finely divided solid polyamide at a temperature of at least 80° C., and thereafter subjecting the mixture to mechanical agitation such as tumbling while the polyamide remain in the solid phase.

DETAILED DESCRIPTION OF THE PREFERRED EMBODIMENT

Suitable plasticizers which can be used in this process are, for example, octyl p-hydroxybenzoate, benzenesulphonamide, benzenesulphonic acid N-alkylamides, wherein the alkyl radicals carry a total of 1 to 20 C atoms, such as, for example, benzenesulfonic acid N-butylamide, benzenesulfonic acid N-octylamide or benzenesulfonic acid N-cyclohexylamide, and toluenesulfonamide and toluenesulfonic acid N-alkylamides, wherein the alkyl groups can contain 1 to 20 C atoms, such as, for example, toluenesulfonic acid N-ethylamide. Benzenesulfonic acid N-alkylamide or p-toluenesulfonamide are preferred.

Notably, in the context of the present invention, there is no limit on the plasticizer concentration. However, the customary concentrations are preferably 2 to 25 per cent by weight, and particularly between 5 and 16 per cent by weight based on the solid polyamide.

The plasticizers can be employed individually or as a mixture.

Suitable polyamides which can be used in the present invention are the crystalline thermoplastic products having DSC melting points of preferably at least 150° C. Polyamides having melting points of 150° to 300° C. are particularly preferred. The polyamide is preferably prepared from lactams, ω-aminocarboxylic acids having at least 6 C atoms in the molecule or from salts of diamines and dicarboxylic acids which contain at least 12 C atoms in the structural element. Copolyamides having comonomer contents of not more than 15 mol % are also suitable for use.

Homopolyamides (nylons) which can be used are, for example, polyamide 6, polyamide 66, polyamide 69, polyamide 612, polyamide 1012, polyamide 1212, polyamide 11 and polyamide 12. The process according to the present invention is preferably suitable for polyamide 612, polyamide 1012, polyamide 11 and polyamide 12.

The identification of the polyamides (PA) corresponds to the international standard (H. Domininghaus, Die Kunststoffe und ihre Eigenschaften [Plastics and their Properties], VDI-Verlag, page 272, (1976)).

Further polyamides useable in the present invention are those described in Kunstotoff-Handbuch [Plastics Handbook], Volume VI, C.-Hanser-Verlag (1966), DE-C 21 52 194 and DE-A 25 03 308. In general, they are semicrystalline and have, for example, the following preferred viscosity number ranges:

| Polyamide Type | Viscosity No. |
| --- | --- |
| PA 6 | 150–400 |
| PA 11 | 100–360 |
| PA 12 | 100–360 |
| PA 612 | 120–260 |

The polyamides mentioned can be used individually or as a polymer mixture or blend.

Suitable copolyamides are those which contain monomers which maybe polymerized to the above-mentioned homopolyamides, possible co-monomers are lauryl lactam, 11-aminoundecanoic acid, caprolactam, adipic acid/hexamethylenediamine, dodecanedioic acid/hexamethylenediamine, dodecanedioic acid/methyl-substituted pentanediamine, dodecanedioic acid/decamethy-lenediamine and dodecanedioic acid/isophoronediamine. However, the comonomer contents should not exceed 15 mol %.

Preferred copolyamides are prepared from lauryl lactam/caprolactam, lauryl lactam/adipic acid+hexamethylenediamine, lauryl lactam/dodecanedioic acid+decamethylenediamine and 11-aminoundecanoic acid/caprolactam, and have a crystalline melting point of at least 150° C.

Such copolyamides are described, for example, in DE-OS 39 21 164, 23 24 160, 19 39 758 and 32 48 776.

The copolyamides mentioned can be used individually or as mixtures.

Incorporation of the plasticizer into the solid phase polyamide by mechanical agitation is preferably carried out at a temperature of at least 10° C. below the solid polyamide melting point as determined by DSC. A temperature within the range of 80° to 180° C. is particularly preferred, a temperature within the range of 115° to 135° C. being most preferred.

In order to incorporate the plasticizer, the polyamide is introduced, in a finely divided solid state, into an agitator. In the context of the present invention, the polyamide is finely divided if the particle sizes are in the range from 0.5 to 10 mm. Particle sizes of 2.5 to 6 mm are preferred. Tumble driers, paddle driers and fluidized bed driers are suitable containers for imparting mechanical agitation. The plasticizer incorporation is preferably carried out in a tumble drier or paddle drier.

In carrying out the process, the finely divided polyamide is added to the dryer and heated under a blanket of inert gas, preferably under $N_2$, while the dryer is turning. The jacket temperature of the drier is, in general, set at a temperature of at least 80° C. up to a maximum temperature which is 10° C. below the polymer melting point depending upon the particular polyamide. For polyamides which require temperatures of 115° to 135° C., which are particularly preferred, the jacket temperature of the drier is brought to 120° to 140° C. The liquid or molten plasticizer is sprayed onto the solid state polyamide by means of a spray nozzle over 0.5 to 6 hours, preferably over 1 to 3 hours. The polyamide remains in the solid phase during the entire process of plasticizer incorporation. The closed drier is then allowed to rotate and agitate for a further 1 to 5 hours, preferably 2 to 4 hours.

Thereafter, while revolving continues, either nitrogen is passed into the dryer under normal pressure, until the desired degree of plasticizer incorporation is reached, or post-condensation of the polyamide is carried out in the solid phase wherein the drier jacket temperature is increased.

Alternatively, the plasticizer can be added to the solid phase polyamide in the above-mentioned temperature range in the cooling phase of the granules which have been pre-dried or subjected to post-condensation in the solid phase.

Incorporation of the plasticizer can also take place in the presence of various stabilizers and processing additives. These additional additives can preferably be blended with the polymer before the plasticizer is added. However, they can also be sprayed onto the heated solid phase polyamide granules at the same time as a solution or dispersion in the plasticizer.

The process of incorporating plasticizer into solid phase polyamides, according to the present invention, does not have the disadvantages previously mentioned for other known processes, e.g. melt blending. The plasticizer is thus incorporated under mild thermal and mechanical conditions. Additionally, additives can be homogeneously incorporated, without plasticizer emissions. Furthermore, no kneader, extruder or expensive metering device is needed because the polyamide is never melted. Finally, incorporation of plasticizer, starting from pellets, is achieved without repetitive pelletizing and drying steps, which tend to destroy the molecular weight and mechanical properties of the polyamide. The incorporation can advantageously be carried out in the drying or solid phase post-condensation polymerization process of the solid polyamide pellets.

Other features of the invention will become apparent in the course of the following descriptions of exemplary embodiments which are given for illustration of the invention and are not intended to be limiting.

EXAMPLES

The following experimental methods, identified by standard test methods, have been utilized in the characterization of polyamides and their blends as contemplated by the present invention.

The viscosity number is determined in accordance with DIN 53 727.

ASTM D-4019 was used to determine resin water content.

The melting point determination utilizing DSC was performed in accordance with ASTM D-3418-82.

Extractable content of resins was determined in accordance with DIN 53 738.

A Hewlett Packard Type 1090L chromatograph with a ternary pump system (PVS), and a filter photometer detector (wavelength 269 nm) and a Li-Chrospher 100 RP-8 (5 μm) column system were used to perform HPLC analysis.

Example 1

7 (metric) tons of PA-12 granules (DSC melting point: 179° C.; viscosity number: 180; water content: 0.25 per cent by weight) was introduced into a tumble drier (V=20 $m^3$). After flushing with nitrogen, 35 kg of N,N'-hexamethylene-bis-( 3,5-di-tert.-butyl-4-hydroxy-hydrocinnamide) (IRGANOX 1098 from Ciba-Geigy, Switzerland) was added as an antioxidant. The drier content was then dry blended at a speed of rotation of 10 rpm over a period of 2 hours.

The mixture was heated at a jacket temperature of 170° C. while passing in nitrogen (20 $m^3$/h). After the pellets temperature reached 125° C, the jacket temperature was brought to 130° C., the nitrogen supply was discontinued and the drier was closed. 1.05 metric tons of benzenesulphonic acid N-butylamide plasticizer (DELLATOL BBS from Bayer, D-5090 Leverkusen), heated to 55° C., was sprayed onto the solid phase pellets by means of a nozzle over the course of 2 hours. After a further two hours, nitrogen was again passed in and the jacket temperature increased to 155° C. The pellets remained in the solid phase.

During the solid post-condensation polymerization, a sample was taken from the drier every hours in order to determine the viscosity number. When the viscosity number reached 190, the contents of the drier were cooled.

Colorless, dry granules, without agglomerated pellets were obtained. The drier wall was free from caking. The following analytical values were determined on the pellets:
Water content: 0.016 per cent by weight
Viscosity number, after extraction with ethanol: 224
Antioxidant content according to HPLC: 0.43 per cent by weight which corresponds to initial antioxidant concentration.
Plasticizer content according to HPLC: 13.0 per cent by weight which corresponds to initial plasticizer concentration.

Example 2

7 metric tons of PA-1012 granules (DSC melting point: 192° C.; viscosity number: 170; water content: 0.3 per cent by weight) was introduced into a tumble drier (V=20 $m^3$). After flushing, the contents of the drier was heated at a jacket temperature at 170° C., at a speed of rotation of 10 rpm under normal pressure while passing in nitrogen (20 $M^3$/h).

After a further 6 hours, heat was switched off. When the pellet temperature reached 128° C., the jacket temperature was set at 130° C. nitrogen flow was discontinued and the drier closed. 350 kg of p-toluenesulphonamide plasticizer, heated to 70° C., was then sprayed onto the solid phase pellets by means of a nozzle, over a one hour period. After a further two hours, nitrogen was again passed in and the contents of the drier cooled.

Colorless, dry pellets were obtained. The drier wall was free from caking. The following analytical values were determined.

Water content: 0.04 per cent by weight
Viscosity number after extraction with ethanol: 190
Plasticizer content according to HPLC: 4.8 per cent by weight which corresponds to initial concentration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for homogeneously incorporating a plasticizer into a solid phase polyamide, comprising;

applying a liquid or molten plasticizer to a finely divided solid polyamide at a temperature of at least 80° C., and thereafter subjecting said mixture to mechanical agitation at a temperature at least 10° C. below the melting point of said polyamide, wherein said polyamide is maintained in the solid phase, during said mechanical agitation.

2. The process of claim 1, wherein a temperature of 80° to 180° C. is maintained during said agitation.

3. The process of claim 1, wherein said agitation is carried out in a tumble or paddle drier.

4. The process of claim 1, wherein said plasticizer is selected from the group consisting of octyl-p-hydroxybenzoate, benzenesulfonamide, benzenesulphonic acid N-alkylamides, wherein said alkyl radical contains 1–20 carbon atoms, toluenesulphonamide,and toluenesulphonic acid N-alkylamides, wherein said alkyl group contains 1 to 20 carbon atoms.

5. The process of claim 1, wherein said plasticizer is selected from the group consisting of benzenesulphonic acid, N-alkylamides and p-toluene sulphonamide.

6. The process of claim 1, wherein said plasticizer concentration is between 2 and 25 weight % based on said solid phase polyamide.

7. The process of claim 1, wherein said plasticizer concentration is between 5 and 16% by weight based on said solid phase polyamide.

8. The process of claim 1, wherein said solid phase polyamide is selected from the group consisting of polyamide 6, polyamide 66, polyamide 69, polyamide 612, polyamide 1012, polyamide 1212, polyamide 11, polyamide 12 and mixtures therein.

9. The process of claim 1, wherein said solid phase polyamide is selected from the group consisting of polyamide 612, polyamide 1012, polyamide 11, polyamide 12 and mixtures therein.

10. The process according to claim 9, wherein said solid phase polyamide is a polymer mixture or blend.

11. The process according to claim 1, wherein said finely divided solid phase polyamide comprises particles of from 0.5 to 10 mm.

12. The process according to claim 11, wherein said finely divided solid phase polyamide comprises particles of from 2.5 to 6 mm.

* * * * *